United States Patent [19]

Sowinski

[11] Patent Number: 4,653,187

[45] Date of Patent: Mar. 31, 1987

[54] CONNECTOR FABRICATION METHOD AND APPARATUS

[75] Inventor: Leonard Sowinski, Chicago, Ill.

[73] Assignee: Molex Incorporated, Lisle, Ill.

[21] Appl. No.: 793,408

[22] Filed: Oct. 31, 1985

[51] Int. Cl.4 ........................ H01R 43/00; B23P 19/00

[52] U.S. Cl. ........................................ 29/884; 29/747; 29/564.6

[58] Field of Search ................. 29/857, 858, 859, 865, 29/866, 747, 748, 564.6, 566.2, 566.3

[56] References Cited

U.S. PATENT DOCUMENTS

| | | | |
|---|---|---|---|
| 3,550,250 | 12/1970 | Cervenka et al. | 29/747 X |
| 3,562,903 | 2/1971 | Busler et al. | 29/564.6 X |
| 4,214,361 | 7/1980 | Coldren et al. | 29/753 X |
| 4,335,497 | 6/1982 | Casey | 29/748 X |
| 4,411,484 | 10/1983 | Casey | 29/866 X |
| 4,519,132 | 5/1985 | Kleinedler et al. | 29/747 X |

*Primary Examiner*—Mark Rosenbaum
*Assistant Examiner*—Carl J. Arbes
*Attorney, Agent, or Firm*—Louis A. Hecht

[57] ABSTRACT

Disclosed is an apparatus for voiding selected terminals from a connector assembly wherein an array of terminals, joined to a common carrier member, are partially preloaded in a connector housing. The apparatus includes a punch having a first projection which engages and deforms the terminal. The punch further includes a second projection following the first projection, for severing the terminal from the carrier strip. The selected terminals are disengaged and extracted from the connector housing and severed from the carrier member, at the voiding station.

11 Claims, 8 Drawing Figures

FIG. 3
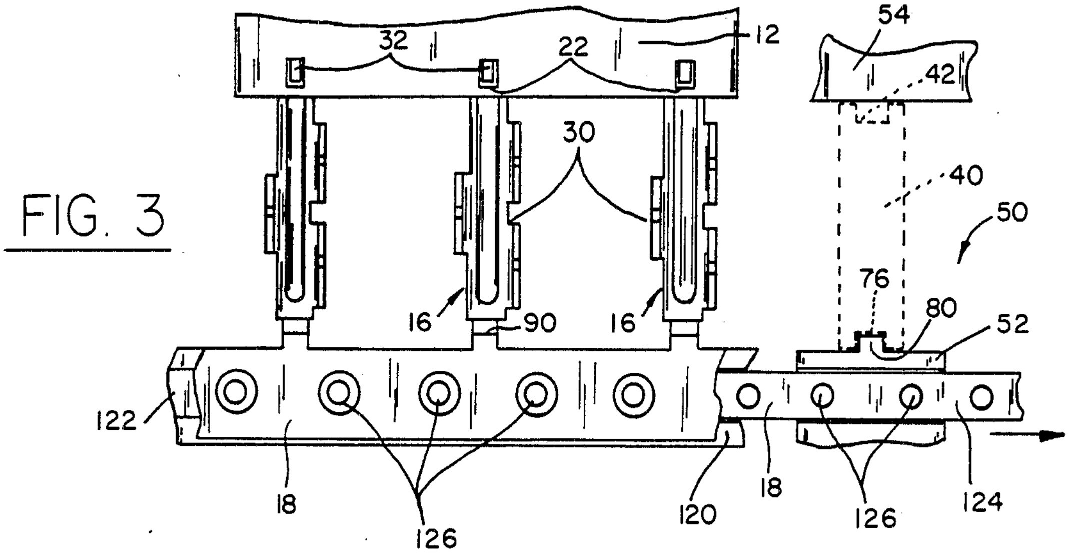
FIG. 5
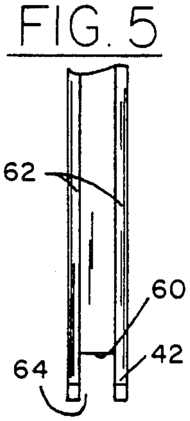
FIG. 4
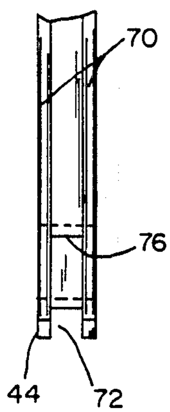
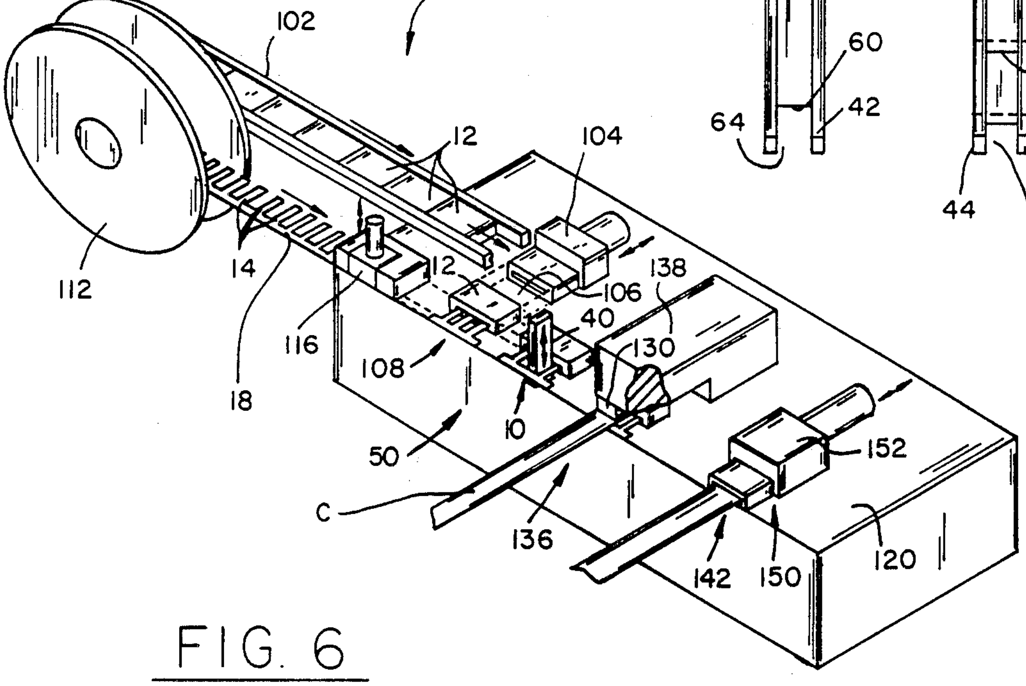
FIG. 6

CONNECTOR FABRICATION METHOD AND APPARATUS

BACKGROUND OF THE INVENTION

1. Field of the Invention

The present invention relates to methods and apparatus for fabricating an electrical connector of the type including a dielectric housing having a plurality of terminal-receiving cavities, with terminals in at least some of the cavities. In particular, the present invention pertains to methods and apparatus for voiding or removing terminals from predetermined connector cavities.

2. Brief Description of the Prior Art

In order to mass terminate a plurality of terminals to wire conductors, machines have been developed to partially preload the terminals into the terminal receiving cavities of a connector housing, so that their wire engaging portions remain outside the housing. Subsequently, a termination assembly of suitable configuration electrically connects or terminates the wire conductors to the wire engaging portion of the terminals. The partially preloaded terminals are then inserted completely to assume fully loaded positions in the connector housing.

An example of the above apparatus is disclosed in commonly owned U.S. patent application Ser. No. 584,041 filed Feb. 27, 1984, now U.S. Pat. No. 4,590,650 granted May 27, 1986. Disclosed in an arrangement wherein the terminals associated with a given connector are joined to a common carrier member, thereby facilitating mass insertion and full loading of the terminals with a minimum number of automated steps. Simultaneously, wires are terminated in each of the partially preloaded terminals in a single mass loading operation. Thereafter, the carrier member is pushed so as to fully insert the terminals within the connector housing, completing fabrication of the cable harness.

Fully automated terminal preloading and mass insertion capabilities of the type described above offer significant economical advantages to a supplier and manufacturer of electrical connectors. However, the need for voiding selected circuit (terminal) positions of electrical connectors can arise if a given application requires absolute assurance that an electrical circuit will not be completed through a given connector mating position. These requirements arise for reasons of safety for either operating personnel or equipment. For example, there may be a need to ensure that a high voltage electrostatic discharge is not introduced into a low voltage, difficult-to-replace logic circuit or the like.

In the past, connector manufacturers have had to sever selected terminals from the carrier strip, before those terminals were associated with a connector housing. Accordingly, the unique position of the terminal on its carrier had to be known beforehand, before the terminals could be preloaded in an electrical connector housing. Thereafter, the specially prepared terminal assemblies had to be stocked as separate items.

A system having greater flexibility in the terminal selection is desired, particularly one which reduces storage and material handling requirements. In an optimum situation, the assembler of the connector arrangement would select the terminals to be voided at the time of harness fabrication.

It is therefore an object of the present invention to provide an apparatus for automatically voiding selected preloaded terminals partially inserted in housing cavities, or mating positions, of an electrical connector.

Another object of the present invention is to provide an apparatus of the above-described type which is compatible with mass termination and mass insertion connector assembly techniques.

Yet another object of the present invention is to provide terminal voiding apparatus which removes a terminal from a housing cavity and severs that terminal from a common carrier member, in a single automated step.

SUMMARY OF THE INVENTION

These and other objects of the invention are provided in a method of producing an electrical connector which includes a housing with a plurality of terminal receiving cavities and a plurality of terminals mounted in fewer than all of the cavities. The method includes the steps of providing a plurality of terminals joined at least one end to a carrier strip, partially inserting the terminals into corresponding housing cavities to form a partially preloaded connector, and mass inserting said terminals into their corresponding cavities to produce a fully loaded connector. The improvement comprises removing at least one terminal from the partially preloaded connector prior to mass inserting said terminals.

The objects are also provided in an apparatus for producing a fully loaded connector including a housing having a plurality of terminal receiving cavities with a plurality of terminals fully inserted in fewer than all of the cavities, from a partially preloaded connector including a plurality of terminals joined to a carrier strip and partially inserted into all of the cavities. The apparatus comprises terminal severing means which engages the partially preloaded connector for cutting at least one terminal from the carrier strip, terminal removing means which engages the one terminal for withdrawal from the partially preloaded connector, and terminal insertion means for mass inserting the remaining terminals of the partially preloaded connector completely into their respective cavities to form the fully loaded connector.

BRIEF DESCRIPTION OF THE DRAWINGS

In the drawings, wherein like elements are referenced alike,

FIG. 3 shows a plurality of terminals mounted to a carrier strip, being advanced toward a terminal voiding station according to the present invention;

FIGS. 4 and 5 are side views of the punch shown in FIGS. 2*a*–2*c*; and FIG. 6 shows a harness fabrication station.

DETAILED DESCRIPTION OF THE PREFERRED EMBODIMENT

Figure 1:
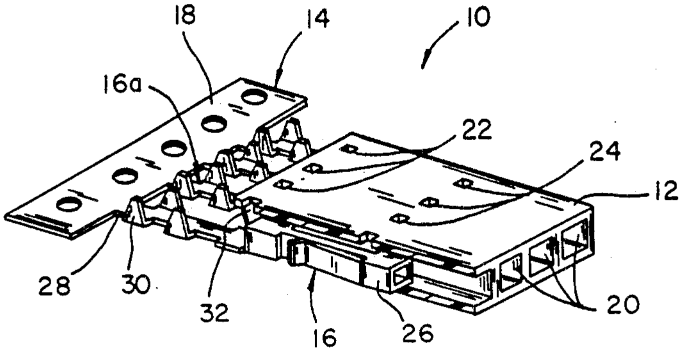
FIG. 1 is a perspective view of an intermediate, partially preloaded connector assembly to which the present invention is directed.

Referring now to the drawings, and particularly to FIG. 1, a connector assembly generally indicated at 10 is shown comprising a housing 12 and an array 14 of terminals 16 joined to a common carrier strip 18. For each terminal to be received therein, housing 12 defines a terminal receiving cavity 20 having a rearward window 22 adjacent the terminal receiving end of the housing, and a forward window 24 adjacent mating end of the housing. Terminals 16 include a forward mating portion 26, a rear portion 28 integrally joined to carrier 18, and an intermediate conductor engaging portion 30. Terminals 16 also include a locking tang 32 mounted forwardly of conductor engaging portion 30. Additional features of the connector assembly along with an apparatus for forming the connector assembly into a cable harness are given in commonly owned U.S. patent application Ser. No. 584,041 filed Feb. 27, 1984, the disclosure of which is herein incorporated by reference.

Connector assembly 10 is provided to an end user with the terminal array 14 partially inserted ("partially preloaded") in housing 12, with locking tangs 32 engaging the rearward windows 22. The conductor engaging portions 30 of each terminal are exposed outside of housing 12, reading for mating with a flat flex cable conductor assembly. Those skilled in the art will readily appreciate that other types of conductor assemblies, such as arrays of discrete wires or flat ribbon cables, could also be employed with suitable conventional modifications to the terminal conductor engaging portions. In either event, the mode of termination of the terminals is not important to the present invention.

In the past, if an end user required that a particular terminal may be removed from array 14, the terminal array must first be modified before association with housing 12. According to the present invention, however, terminals 16 can be selectively removed or voided from connector assembly 10, even after partial insertion of terminal array 14 within housing 12. Thus, an end user need only stock a single part number for a given connector type. On demand, particular terminals 16 can be removed from a connector assembly, as those connectors are made ready for harness fabrication.

Referring now to FIGS. *2a–2c*, operation of the present invention is shown in three sequential steps, wherein a terminal 16*a* is voided from a connector assembly 10. A punch 40 according to the present invention includes a first forward projection 42 and a second rearward projection 44. A pocket 46 for receiving conductor engaging portion 30 is formed between projections 42, 44.

Punch 40 is mounted at a terminal voiding station 50 for vertical reciprocation, in cooperation with a die 52 and a connector holder 54. For reasons which will become apparent later, the bottom rear portion 56 of holder 54 is inset forwardly of the rearmost bottom portion 12' of housing 12, to allow downward deflection thereof. As can be seen in FIG. *2a*, carrier strip 18, a small part of rear terminal portion 28, and the forward majority of housing 12 are rigidly supported from below. The rear bottom portion 12' of housing 12 and the entire conductor engaging portion 30 of terminal 16 is left unsupported.

FIG. *2a* shows punch 40 initially engaging the terminal 16*a* of connector assembly 10. In FIG. *2b*, punch 40 has been driven in a downward direction such that the first forward projection 42 has deflected terminal 16*a* with a concave bend B (as viewed from above) to facilitate extraction of the terminal from housing 12. As can be seen in FIG. *2b*, locking tang 32 has become disengaged from rear window 22 and from the upper wall of housing 12. To accommodate the bending of terminal 16*a*, the rearmost bottom wall portion 12' of housing 12 is outwardly deflected, with terminal 16*a* taking on a generally L-shaped bend, wherein the included angle of the bend lies in a range between 100 and 150 degrees, depending on the particular geometry and materials composition of connector 10.

Referring also to FIG. 5, first projection 42 has a bending surface 60 formed between a pair of opposed walls 62. As can be seen in FIGS. *2c* and 5, walls 62 are spaced apart to form recesses 64, 66 for receiving and guiding terminal 16.

Figure 2A:
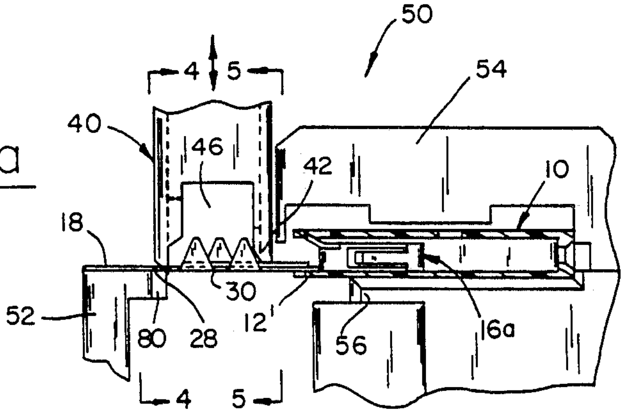
FIGS. 2*a*–2*c* show three sequential operating steps according to the present invention, wherein a terminal is voided from a connector assembly.
Figure 2B:
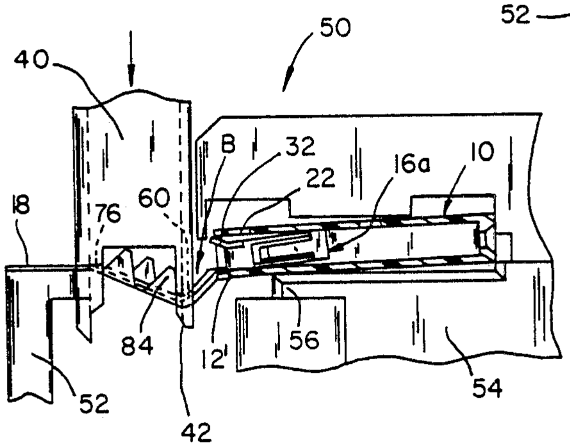
Figure 2C:
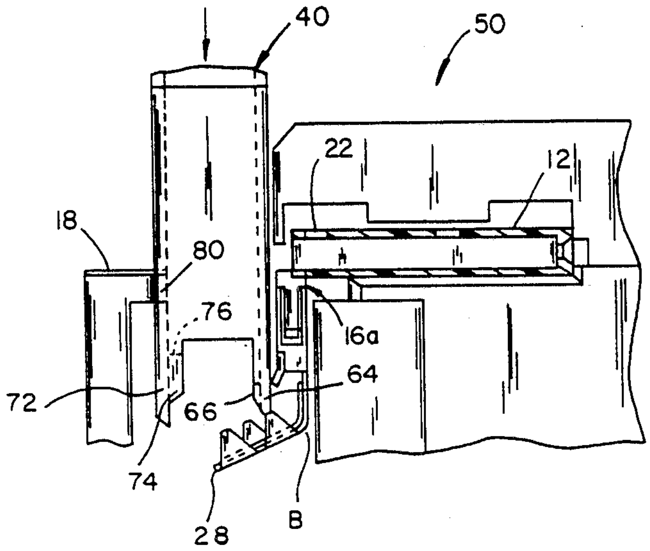

Referring to FIGS. 2 and 4, the second projection 44 of punch 40 is of a similar construction, wherein opposed walls 70 form terminal receiving recesses 72, 74. A severing surface 76 is positioned in recess 74 between walls 70. The outward recess 72 of the rearward projection is dimensioned for close engagement with a forward guide portion 80 of die 52. Similarly, the outward recess 66 of forward projection 42 is dimensioned for sliding engagement with a guide surface not shown in the drawings.

Between the steps shown in FIGS. *2a*, *2b*, terminal 16*a* has been received in recesses 64, 66 and 72, 74 of first and second projections 42, 44. Thus, the terminal has been confined against rolling in a plane perpendicular to its longitudinal axis, during bending of the medial portion of the terminal. The alignment provided by guide portion 80 of die 52 could be replaced by conventional arrangements for aligning punch 40 relative to terminal 16.

FIG. *2b* illustrates the position of punch 40 at a point in time when severing surface 76 initially contacts terminal 16*a*. At this time, the medial portion of terminal 16*a* has been bent due to the downward pressure of bending surface 60, and the upward supporting restraint provided by the forward support of portion 56, and the deformed rear portion 12' of housing 12, and the rearward support of die 52, located at the other end of the terminal.

With continued downward displacement of punch 40, severing surface 76 cuts terminal 16*a* from carrier strip 18. About this time, the forward projection 42 engages the leading tooth-like clinching member 84 of terminal 16*a* to provide any needed completion of the removal step wherein terminal 16*a* is fully extracted from housing 12. In this manner, terminal 16*a* is voided from assembly 10, with the terminal being disengaged and extracted from housing 12, and cut from carrier 18. Having been cleared, terminal 16*a* is freed from a downward movement away from voiding station 50.

In the preferred embodiment, it was found advantageous to provide a weakened portion 90 where terminals 16 are joined to carrier strip 18. This weakened portion is, however, optional, depending upon the design of severing surface 76.

Carrier strip 18 is left attached to the remaining terminals 16 as taught in the above-mentioned patent U.S. Pat. No. 4,590,605. The unmodified connector assembly 10 (as shown in FIG. 1) in effect becomes an intermediate connector assembly operated upon by voiding station 50 to take on its particular final form. The voided connector assembly is then transported to an insertion station where conductors are terminated to portions 30 of each remaining terminal 16, as is known in the art. Thereafter, carrier 18 is pushed toward housing 12 to mass insert the terminals in the connector housing. As a final step, carrier 18 is severed from the remaining terminals 16.

Referring now to FIG. 6, a harness fabrication station indicated generally at 100 is shown according to the present invention. At the upper left corner of the figure, housings 12 are fed along track 102 toward housing load shuttle 104. Shuttle 104 reciprocates along path 106 to present housings 12 to a preloading station 108.

Terminal arrays 14 are conveniently provided on supply reel 112. Arrays 14 are provided on a continuous stamped web and, upon presentation, are cut to size by terminal blanking punch 116.

The various stations of the harness making apparatus 100 are mounted on a table 120 having a channel 122 formed in its upper surface, aligned with carrier 18. An indexing tape 124 having a plurality of upstanding cone-like alignment protrusions 126 are mounted in channel 122 for a close tolerance guiding thereby. Tape 124 comprises an endless loop which is driven by conventional tape drive means not shown in the figures. As is known in the art, tape 124 can be accurately advanced predetermined amounts, to provide accurate alignment of a particular terminal 16 at any point along the upper surface of table 120. Taper 124 provides initial alignment of the terminals with blanking punch 116, and thereafter advances the terminal arrays 14 through the remaining stations of apparatus 100.

Upon arrival of a terminal array 14 at preloading station 108, shuttle 104 is activated to advance a connector housing 12 over the proximate end of array 14, to partially preload the terminals within the housing. Upon retreat of shuttle 104 to its loading position, the partially preloaded intermediate connector assembly 10 is advanced toward voiding station 50 by tape 124, such that a predetermined terminal **16*a* is aligned with punch 40. Punch 40 is mounted for vertical reciprocation with respect to the upper surface of table 120, by conventional reciprocating press means (not shown in the figure for the purpose of clarity). As explained above, punch 40 is lowered into array 14 to void the predetermined terminal 16*a* from the partially preloaded connector assembly 10**.

After terminal **16*a* is voided from the connector assembly, the resulting voided connector assembly is advanced by tape 124 to termination station 136, whereat a conventional press 138 reciprocates a conventional mass termination head 130 toward the remaining terminals 16. A cable assembly C is fed in position over terminals 16, as is known in the art, and press 138 is actuated to terminate cable assembly to the array of remaining terminals 16 to form an intermediate harness assembly 142. Thereafter, tape 124 advances the intermediate harness assembly 142 to a final loading station 150 whereat a horizontally traveling ram 152 engages housing 12 to push it over the terminals 16, whereupon the locking tangs are received in the forward windows 24, and the terminals are fully inserted in housing 12. Tape 124 then advances the harness assembly to a carrier removal station (not shown in the figures) to complete fabrication of the harness. The carrier removal station need only include a reciprocating press which deflects that portion of cable C positioned adjacent carrier 18. This action causes weak spots 90 to completely sever wherein carrier 18 is separated from the terminals 16**.

Thus, it can be seen that the above-described apparatus provides a selectively voided connector assembly using full automation techniques.

I claim:

1. A method of producing an electrical connector which includes a housing with a plurality of terminal receiving cavities and a plurality of terminals mounted in fewer than all of the cavities, the method including the steps of providing a plurality of terminals joined at least one end to a carrier strip, partially inserting the terminals into corresponding housing cavities to form a partially preloaded connector, and mass inserting said terminals into their corresponding cavities to produce a fully loaded connector, the improvement comprising:

removing at least one terminal from the partially preloaded connector prior to mass inserting said terminals.

2. The method of claim 1 wherein said removing step includes punching at least one terminal to sever it from the carrier strip; and withdrawing said severed terminal from the partially preloaded connector assembly.

3. The method of claim 2 wherein said one terminal is engaged with the housing and said withdrawing step includes disengaging said one terminal from the housing; and extracting the disengaged terminal from its corresponding cavity.

4. An apparatus for producing a fully loaded connector including a housing having a plurality of terminal receiving cavities with a plurality of terminals fully inserted in fewer than all of said cavities, from a partially preloaded connector including a plurality of terminals joined to a carrier strip and partially inserted into all of said cavities, said apparatus comprising:

terminal severing means which engages said partially preloaded connector for cutting at least one terminal from the carrier strip;

terminal removing means which engages said one terminal for withdrawal from said partially preloaded connector; and terminal insertion means for mass inserting the remaining terminals of the partially preloaded connector completely into their respective cavities to form said fully loaded connector.

5. The apparatus of claim 4 wherein said one terminal is engaged with the housing and said terminal removal means bendingly deforms said one terminal away from said housing to permit withdrawal from said partially preloaded connector.

6. The apparatus of claim 5 further comprising a terminal voiding station whereat said partially preloaded connector assembly is presented and said terminal is cut and withdrawn, and reciprocal punch means at said voiding station for mounting said severing and said removing means for movement toward and away from said one terminal.

7. The apparatus of claim 6 further comprising an insertion station whereat said terminal insertion means is mounted and means to move said partially preloaded connector assembly from said terminal voiding station to said insertion station.

8. The apparatus of claim 6 further comprising a loading station whereat a plurality of partially preloaded connector assemblies are presented one at a time, and means to move said partially preloaded connector assemblies one at a time from said loading station to said terminal voiding station.

9. The apparatus of claim 6 wherein said severing means and said removing means comprises first and second spaced-apart terminal engaging arms, respectively projecting from said punch means toward said one terminal.

10. The apparatus of claim 9 wherein said removing means imparts a concave bend to medial portions of said one terminal to disengage said withdraw said one terminal from the housing.

11. The apparatus of claim 10 wherein said second arm is configured to lead said first arm as said punch is moved towards said one terminal, whereby said first arm cuts said bent terminal from the carrier strip.

* * * * *